(12) United States Patent
Zhan et al.

(10) Patent No.: US 12,183,116 B2
(45) Date of Patent: Dec. 31, 2024

(54) FINGERPRINT SENSOR IMAGE CALIBRATION METHOD, ELECTRONIC DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Wenxi Zhan, Guangdong (CN); Biao Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 452 days.

(21) Appl. No.: 17/523,866

(22) Filed: Nov. 10, 2021

(65) Prior Publication Data
US 2022/0067330 A1  Mar. 3, 2022

Related U.S. Application Data

(63) Continuation of application No. PCT/CN2020/090624, filed on May 15, 2020.

(30) Foreign Application Priority Data

May 29, 2019 (CN) .......................... 201910459499.5

(51) Int. Cl.
*G06V 40/13* (2022.01)
*G06F 21/32* (2013.01)
(Continued)

(52) U.S. Cl.
CPC .......... *G06V 40/1318* (2022.01); *G06F 21/32* (2013.01); *G06T 7/97* (2017.01); *G06V 40/1353* (2022.01)

(58) Field of Classification Search
CPC ..................................................... G06V 40/12
See application file for complete search history.

(56) References Cited

U.S. PATENT DOCUMENTS 8,036,431 B1  10/2011  Fisher et al.
10,216,975 B1  2/2019  He et al.
(Continued)

FOREIGN PATENT DOCUMENTS

CN  1352436  6/2002
CN  201628972 U  * 11/2010
(Continued)

OTHER PUBLICATIONS

CNIPA, First Office Action for CN Application No. 201910459499.5, Nov. 2, 2020.
(Continued)

*Primary Examiner* — Guillermo M Rivera-Martinez
(74) *Attorney, Agent, or Firm* — Hodgson Russ LLP

(57) ABSTRACT

A calibration method, an electronic device, and a non-transitory computer-readable storage medium are provided. The calibration method is applicable to an electronic device including a fingerprint sensor. The calibration method includes the following. Fingerprint collection is performed with the fingerprint sensor to obtain a first fingerprint image. A first numerical value is determined according to the first fingerprint image, a first calibration image, and a second calibration image, where the first numerical value is indicative of a change in brightness of a light source for the fingerprint collection, the first calibration image is an image obtained by performing image collection on a bright surface of a calibration box, and the second calibration image is an image obtained by performing image collection on a dark (Continued)

surface of the calibration box. The first fingerprint image is calibrated according to the first numerical value to obtain a second fingerprint image.

14 Claims, 5 Drawing Sheets

(51) Int. Cl.
*G06T 7/00* (2017.01)
*G06V 40/12* (2022.01)

(56) References Cited

U.S. PATENT DOCUMENTS

| | | | |
|---|---|---|---|
| 2010/0183200 | A1 | 7/2010 | Wu |
| 2016/0078270 | A1 | 3/2016 | Lee et al. |
| 2017/0140233 | A1 | 5/2017 | Andersson et al. |
| 2017/0364728 | A1* | 12/2017 | Bachurinskii ...... G06V 40/1382 |
| 2018/0137337 | A1* | 5/2018 | Zeng .................. G06V 40/1318 |
| 2019/0050619 | A1* | 2/2019 | Kern ...................... G06V 40/13 |
| 2020/0250391 | A1* | 8/2020 | Cao .................... G06V 40/1318 |

FOREIGN PATENT DOCUMENTS

| | | | | |
|---|---|---|---|---|
| CN | 105704676 | A * | 6/2016 | |
| CN | 106067014 | | 11/2016 | |
| CN | 107111760 | | 8/2017 | |
| CN | 107636686 | | 1/2018 | |
| CN | 107657240 | | 2/2018 | |
| CN | 108038836 | A * | 5/2018 | ............... G06T 5/40 |
| CN | 108496184 | | 9/2018 | |
| CN | 108701218 | A | 10/2018 | |
| CN | 108919977 | | 11/2018 | |
| CN | 108932486 | | 12/2018 | |
| CN | 109376630 | | 2/2019 | |
| CN | 109643379 | A * | 4/2019 | ........... G06K 9/0004 |
| CN | 109657606 | A * | 4/2019 | ........... G06K 9/0004 |
| CN | 109685032 | | 4/2019 | |
| CN | 109697402 | A * | 4/2019 | ............. G06F 18/00 |
| CN | 109711255 | | 5/2019 | |
| CN | 109784268 | | 5/2019 | |
| CN | 108701218 | B | 2/2021 | |

OTHER PUBLICATIONS

CNIPA, Notification to Grant Patent Right for Invention for CN Application No. 201910459499.5, Jul. 23, 2021.
WIPO, International Search Report for PCT/CN2020/090624, Aug. 21, 2020.
EPO, Extended European Search Report for EP Application No. 20814524.3, Aug. 30, 2022.
CNIPA, First Office Action for CN Application No. 202110996662.9, Oct. 25, 2023.
EPO, Partial Supplementary European Search Report for EP Application No. 20814524.3, May 30, 2022.

* cited by examiner

FINGERPRINT SENSOR IMAGE CALIBRATION METHOD, ELECTRONIC DEVICE, AND NON-TRANSITORY COMPUTER-READABLE STORAGE MEDIUM

CROSS-REFERENCE TO RELATED APPLICATION(S)

This application is a continuation of International Application No. PCT/CN2020/090624, filed on May 15, 2020, which claims priority to Chinese Patent Application No. 201910459499.5, filed on May 29, 2019, the entire disclosures of which are hereby incorporated by reference.

TECHNICAL FIELD

This disclosure relates to the field of electronic technologies, and more particularly to a calibration method, an electronic device, and a non-transitory computer-readable storage medium.

BACKGROUND

Optical fingerprints have relatively high requirements on ambient light and stability of optical path, which may be calibrated before the shipment of electronic devices (such as smart phones, tablet computers, etc.). For example, the calibration is performed by adopting a differential calibration scheme involving two fixed reflective surfaces (i.e., bright surface and dark surface) of a calibration box to eliminate background noise. However, with use of the electronic device, aging of a display screen of the electronic device or a difference of backgrounds of an unlocking interface may cause a change in brightness of a fingerprint sensing region during image collection. In this case, if the calibration is still performed by subtracting the fixed background noise, a signal noise ratio (SNR) of signals may be reduced, and even a grid formed due to wires of a touch panel (TP) may appear.

SUMMARY

Implementations of the disclosure provide a calibration method, an electronic device, and a non-transitory computer-readable storage medium.

According to a first aspect, implementations of the disclosure provide a calibration method. The calibration method is applicable to an electronic device including a fingerprint sensor. The calibration method includes the following. Fingerprint collection is performed with the fingerprint sensor to obtain a first fingerprint image. A first numerical value is determined according to the first fingerprint image, a first calibration image, and a second calibration image, where the first numerical value is indicative of a change in brightness of a light source for the fingerprint collection, the first calibration image is an image obtained by performing image collection on a bright surface of a calibration box, and the second calibration image is an image obtained by performing image collection on a dark surface of the calibration box. The first fingerprint image is calibrated according to the first numerical value to obtain a second fingerprint image.

According to a second aspect, implementations of the disclosure provide an electronic device. The electronic device includes a fingerprint sensor, a processor, and a memory storing one or more programs. The one or more programs which, when executed by the processor, cause the processor to: perform fingerprint collection with the fingerprint sensor to obtain a first fingerprint image; determine a first numerical value according to the first fingerprint image, a first calibration image, and a second calibration image, where the first numerical value is indicative of a change in brightness of a light source for the fingerprint collection, the first calibration image is an image obtained by performing image collection on a bright surface of a calibration box, and the second calibration image is an image obtained by performing image collection on a dark surface of the calibration box; calibrate the first fingerprint image according to the first numerical value to obtain a second fingerprint image.

According to a third aspect, a non-transitory computer-readable storage medium is provided. The non-transitory computer-readable storage medium stores computer programs. The computer programs, when executed by a processor, cause the processor to: perform fingerprint collection with the fingerprint sensor to obtain a first fingerprint image; determine a first numerical value according to the first fingerprint image, a first calibration image, and a second calibration image, where the first numerical value is indicative of a change in brightness of a light source for the fingerprint collection, the first calibration image is an image obtained by performing image collection on a bright surface of a calibration box, and the second calibration image is an image obtained by performing image collection on a dark surface of the calibration box; calibrate the first fingerprint image according to the first numerical value to obtain a second fingerprint image.

BRIEF DESCRIPTION OF THE DRAWINGS

To describe the technical solutions of the implementations of the disclosure or the related art more clearly, the following will give a brief description of accompanying drawings used for describing the implementations or the related art. Apparently, the accompanying drawings described in the following are merely some implementations of the disclosure. Those of ordinary skill in the art can also obtain other accompanying drawings based on the accompanying drawings described below without creative efforts.

DETAILED DESCRIPTION

The terms used in implementations of the disclosure are merely used to explain the implementations of the disclosure, and are not intended to limit the disclosure. The terms "first", "second", "third", "fourth", and the like used in the specification, the claims, and the accompany drawings of the disclosure are used to distinguish different objects rather than describe a particular order. In addition, the terms "include", "comprise", and "have" as well as variants thereof are intended to cover non-exclusive inclusion.

The electronic devices involved in the implementations of the disclosure may include various handheld devices, vehicle-mounted devices, wearable devices, and computing devices that have wireless communication functions or other processing devices connected to wireless modems, as well as various forms of user equipment (UE), mobile stations (MS), terminal devices, and the like.

Figure 1A:
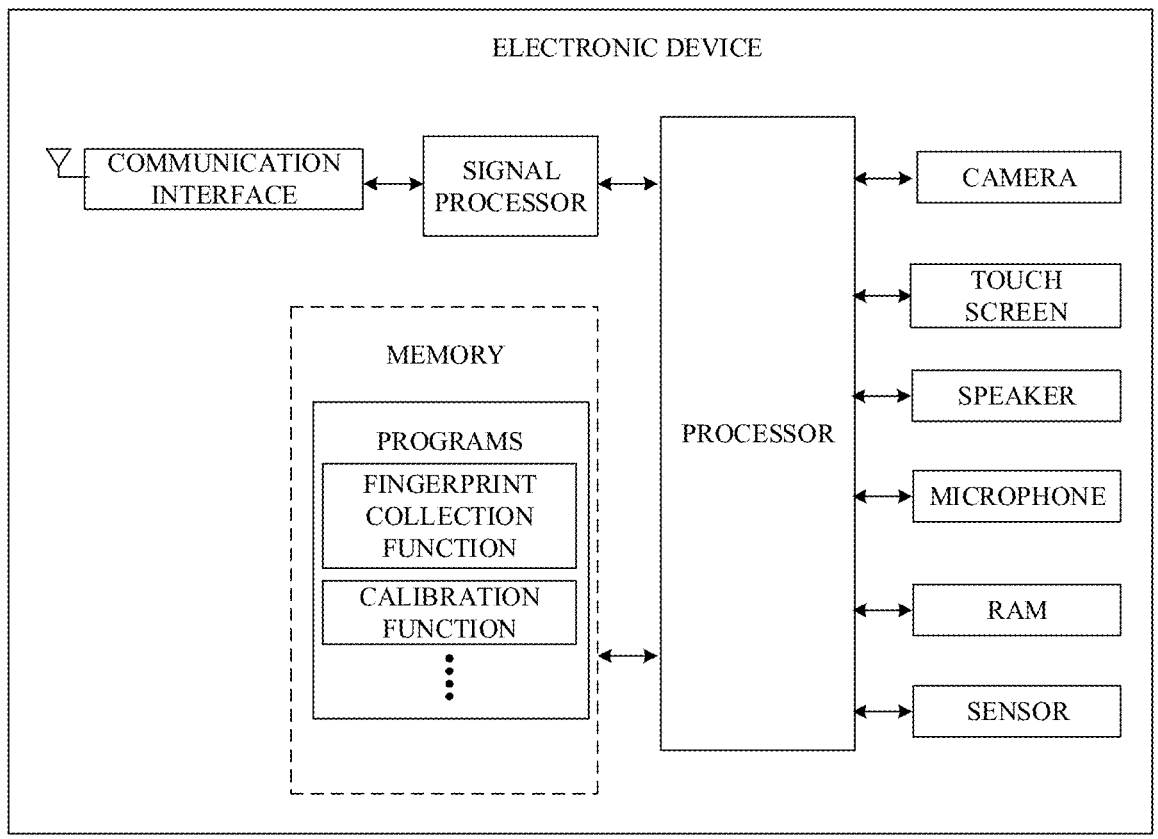
FIG. 1A is a schematic structural diagram illustrating an electronic device according to implementations of the disclosure.

FIG. 1A is a schematic structural diagram illustrating an electronic device according to implementations of the disclosure. As illustrated in FIG. 1A, the electronic device includes a processor, a memory, a signal processor, a communication interface, a touch screen, a speaker, a microphone, a random access memory (RAM), a camera, a sensor, and so on.

The processor may be an application processor (AP) or other processors.

The memory, the signal processor, the touch screen, the speaker, the microphone, the RAM, the camera, and the sensor are coupled to the processor. The communication interface is coupled to the signal processor.

The touch screen includes a display screen and a TP. The touch screen has a fingerprint collecting region. The TP includes metal wires which form a grid. The fingerprint collecting region is a region the touch screen, that is, the fingerprint collecting region is a relatively large region that can receive synchronous pressing of multiple fingers. Alternatively, the fingerprint collecting region is a relatively small region of the touch screen that can only receive pressing of a single finger at a time. The disclosure is not limited thereto. The fingerprint collecting region may be in a middle region, an upper region, a lower region of the touch screen, or the like, which are not limited herein.

Figure 1B:
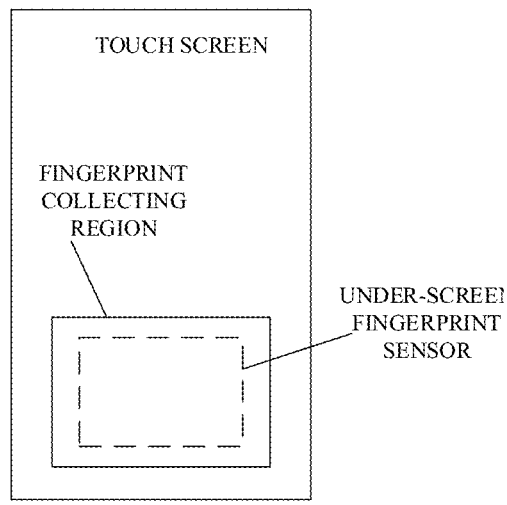
FIG. 1B is a schematic diagram illustrating a positional relationship between a fingerprint sensor and a fingerprint collecting region according to implementations of the disclosure.

The sensor includes a fingerprint sensor, an infrared sensor, a gyroscope, or the like. The fingerprint sensor is an optical fingerprint sensor. The fingerprint sensor can be disposed below the fingerprint collecting region (as illustrated in FIG. 1B) or may not be disposed below the fingerprint collecting region (for example, the fingerprint sensor can be integrated in the touch screen). The disclosure is not limited thereto. In the case where the fingerprint sensor is disposed below the fingerprint collecting region, the fingerprint sensor can collect light signals from the fingerprint collecting region.

The principle of regional under-screen fingerprint collection is generally as follows. Lights emitted from the fingerprint collecting region illuminate a finger placed on the fingerprint collecting region, and after the lights reach the finger, the lights are reflected by the finger, such that the fingerprint sensor disposed below the fingerprint collecting region can receive reflected light signals. Due to uneven patterns of the finger, for different patterns of the finger light absorption may be different, and therefore a fingerprint image different parts of which have different brightness may be obtained.

In at least one implementation, the processor is configured to: perform fingerprint collection with the fingerprint sensor to obtain a first fingerprint image, determine a first numerical value according to the first fingerprint image, a first calibration image, and a second calibration image, where the first numerical value is indicative of a change in brightness of a light source for the fingerprint collection, the first calibration image is an image obtained by performing image collection on a bright surface of a calibration box, and the second calibration image is an image obtained by performing image collection on a dark surface of the calibration box, and calibrate the first fingerprint image according to the first numerical value to obtain a second fingerprint image. In one example, the bright surface and dark surface of the calibration box are different in color.

In at least one implementation, the processor configured to determine the first numerical value according to the first fingerprint image, the first calibration image, and the second calibration image is configured to: determine N signal value matrices according to a signal value matrix of the first fingerprint image, a signal value matrix of the first calibration image, a signal value matrix of the second calibration image, a first function, and N sets of numerical values, where each set of numerical values includes a second numerical value and a third numerical value, each second numerical value is indicative of a change in the brightness of the light source for fingerprint collection, and the N signal value matrices and the N sets of numerical values are in one-to-one correspondence; obtain N variances according to each of the N signal value matrices and a variance formula; determine a second numerical value corresponding to a first variance as the first numerical value, where the first variance is a minimum variance among the N variances.

In at least one implementation, the processor configured to calibrate the first fingerprint image according to the first numerical value to obtain the second fingerprint image is configured to: obtain the second fingerprint image by performing image calibration according to a signal value matrix of the first fingerprint image, the first numerical value, a signal value matrix of the second calibration image, and a second function, where the second function is: r1=Raw−k*RL, r1 represents a signal value matrix of a fingerprint image calibrated, k is a numerical value, Raw represents a signal value matrix of a fingerprint image without calibration, and RL represents a signal value matrix of a calibration image corresponding to the dark surface of the calibration box.

In at least one implementation, the processor is further configured to: determine that an event to be unlocked corresponding to the fingerprint collection is a set unlocking event, prior to determining the first numerical value according to the first fingerprint image, the first calibration image, and the second calibration image.

In at least one implementation, the processor is further configured to: determine whether a time interval between a time at which a third fingerprint image is collected and a current system time is greater than or equal to a first threshold, where the third fingerprint image is collected before the first fingerprint image, prior to determining the first numerical value according to the first fingerprint image, the first calibration image, and the second calibration image. The processor configured to determine the first numerical value according to the first fingerprint image, the first calibration image, and the second calibration image is configured to: determine the first numerical value according to the first fingerprint image, the first calibration image, and the second calibration image, in response to determining that the time interval between the time at which the third fingerprint image is collected and the current system time is greater than or equal to the first threshold.

In at least one implementation, the processor is further configured to: calibrate the first fingerprint image according to a fourth numerical value to obtain a fourth fingerprint image, in response to the time interval between the time at which the third fingerprint image is collected and the current system time being less than the first threshold, where the fourth numerical value is used for calibration of the third fingerprint image.

In at least one implementation, after calibrating the first fingerprint image according to the first numerical value to obtain the second fingerprint image, the processor is further configured to: obtain, in response to failure of fingerprint verification with the second fingerprint image, a fifth fingerprint image by performing image calibration according to a signal value matrix of the first fingerprint image, a signal value matrix of the second calibration image, and a third function, where the third function is: r2=Raw−RL, r2 represents a signal value matrix of a fingerprint image calibrated, Raw represents a signal value matrix of a fingerprint image with calibration, and RL represents a signal value matrix of a calibration image corresponding to the dark surface of the calibration box; perform fingerprint verification with the fifth fingerprint image.

It can be noted that for the specific implementation process of the operations performed by each module, reference may be made to the specific implementation process described in the following method implementation, which are not described herein.

Figure 2A:
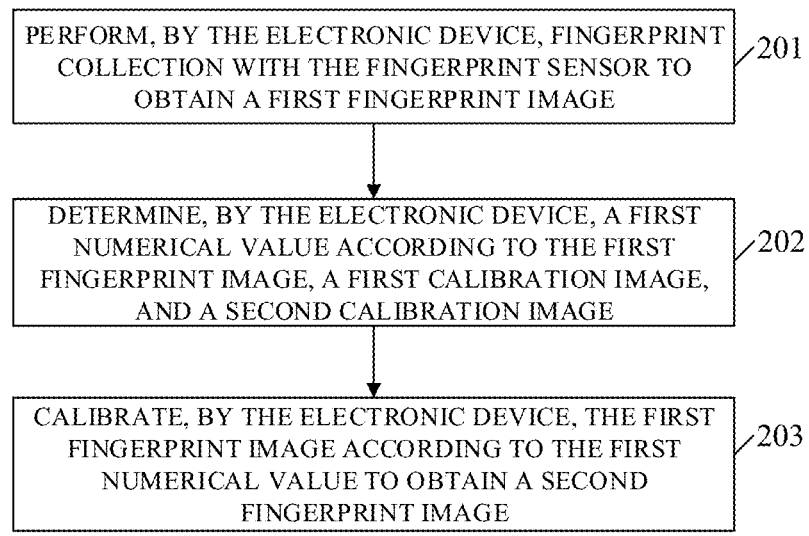
FIG. 2A is a schematic flow chart illustrating a calibration method according to implementations of the disclosure.

FIG. 2A is a schematic flow chart illustrating a calibration method according to implementations of the disclosure. As illustrated in FIG. 2A, the calibration method is applicable to the electronic device described above. The calibration method begins at block 201.

At block 201, the electronic device performs fingerprint collection with the fingerprint sensor to obtain a first fingerprint image.

At block 202, the electronic device determines a first numerical value according to the first fingerprint image, a first calibration image, and a second calibration image.

The first numerical value is indicative of a change in brightness of a light source for the fingerprint collection. The first calibration image is an image obtained by performing image collection on a bright surface of a calibration box, and the second calibration image is an image obtained by performing image collection on a dark surface of the calibration box.

In one example, the calibration box includes two reflective surfaces with different colors (i.e., the bright surface and the dark surface).

The light source for the fingerprint collection may be light emitted from fingerprint collecting region and background, or the light source may be other separate light sources.

Figure 2B:
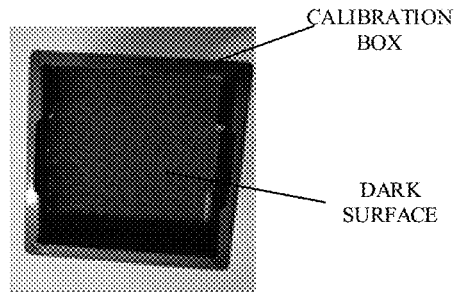
FIG. 2B is a schematic diagram illustrating a dark surface of a calibration box according to implementations of the disclosure.
Figure 2C:
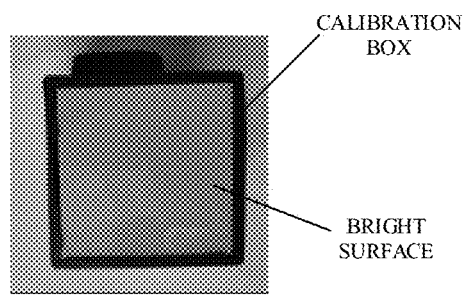
FIG. 2C is a schematic diagram illustrating a bright surface of the calibration box according to implementations of the disclosure.

Brightness of the light source collecting the first calibration image is the same as that of the light source collecting the second calibration image. The first calibration image and the second calibration image are stored in the electronic device in advance. The dark surface of the calibration box is illustrated in FIG. 2B, and the bright surface of the calibration box is illustrated in FIG. 2C.

In at least one implementation, operations at block 202 are as follows.

The electronic device determines N signal value matrices according to a signal value matrix of the first fingerprint image, a signal value matrix of the first calibration image, a signal value matrix of the second calibration image, a first function, and N sets of numerical values, where each set of values includes a second numerical value and a third numerical value, the second numerical value is indicative the change in the brightness of the light source for the fingerprint collection, and the N signal value matrices and the N sets of numerical values are in one-to-one correspondence. The electronic device obtains N variances according to each of the N signal value matrices and a variance formula, where the N variances and the N signal value matrices are in one-to-one correspondence. Thereafter, the electronic device determines a second numerical value corresponding to a first variance as the first numerical value, where the first variance is a minimum variance among the N variances.

According to the optical principle, signal of a collected original fingerprint image is composed of in-screen reflection signal RL and finger reflection signal. The finger reflection signal can be further divided into direct current (DC) signal $F_{DC}$ (i.e., reflection signal of skin of the finger) and alternating current (AC) signal $F_{AC}$ (i.e., reflection signal of ridges and valleys of the finger), and thus the signal of the first fingerprint image can be expressed by: Raw=RL+$F_{DC}$+$F_{AC}$.

If the amplitude of the signal of the optical fingerprint image is proportional to the brightness of the light source during image collection, Raw=$k_1$RL+$k_1F_{DC}$+$k_1F_{AC}$.

Assuming that the optical reflection of the skin of the finger is close to the reflection of the calibration box and a reflection coefficient of the skin of the finger is $k_0$, then Raw=$k_1$RL+$k_1k_0$(RH−RL)+$k_1F_{AC}$.

If $k_2$=$k_1k_0$ and $f_{AC}$=$k_1F_{AC}$, Raw=$k_1$RL+$k_2$(RH−RL)+$f_{AC}$. Therefore, the AC reflective signal of the ridges and valleys of the finger is expressed by: $f_{AC}$=Raw−$k_1$RL−$k_2$(RH−RL).

In the implementation, $f_{AC}$=Raw−$k_1$RL−$k_2$(RH−RL) is determined as the first function, where Raw represents the signal value matrix of the fingerprint image, RL represents a signal value matrix of a calibration image corresponding to the dark surface of the calibration box, RH represents a signal value matrix of a calibration image corresponding to the bright surface of the calibration box, $k_1$ and $k_2$ both are numerical values (for example, a second numerical value and a third numerical value), and $k_1$ is a numerical value associated with the change in the brightness of the light source for fingerprint collection.

The N sets of numerical values are illustrated in Table 1. As illustrated in Table 1, the second numerical value and the third numerical value both range from 0.0 to 1.0.

TABLE 1

| Second numerical value | Third numerical value |
| --- | --- |
| 0.0 | 0.0 |
| 0.0 | 0.1 |
| ... | ... |
| 0.0 | 1.0 |
| 0.1 | 0.0 |
| 0.1 | 0.1 |
| ... | ... |
| 0.1 | 1.0 |
| ... | ... |
| 1.0 | 0.0 |
| 1.0 | 0.0 |
| ... | ... |
| 1.0 | 1.0 |

As can be seen, when the signal value matrix of the first calibration image is substituted into RH in the first function, the signal value matrix of the second calibration image is substituted into RL in the first function, the signal value matrix of the first fingerprint image is substituted into Raw in the first function, and the N sets of numerical values are respectively substituted into the first function, N $f_{AC}$ (i.e. N signal value matrices) can be obtained.

The signal value matrix of the first fingerprint image is composed of a signal value of each pixel of the first fingerprint image. Each pixel of the collected fingerprint image has a signal value. The signal value may be, for example, an analog-to-digital converter (ADC) value. The signal value matrix of the first calibration image is composed of a signal value of each pixel of the first calibration image. The signal value matrix of the second calibration image is composed of a signal value of each pixel of the second calibration image. The number of rows of the signal value matrix of the first fingerprint image, the number of rows of the signal value matrix of the first calibration image, the number of rows of the signal value matrix of the second calibration image, and the number of rows of each of the determined N signal value matrices are the same. The number of columns of the signal value matrix of the first fingerprint image, the number of columns of the signal value matrix of the first calibration image, the number of columns of the signal value matrix of the second calibration image, and the number of columns of each of the determined N signal value matrices are the same.

The signal value matrix of the first fingerprint image includes matrix element j1, the signal value matrix of the first calibration image includes matrix element j2, the signal value matrix of the second calibration image includes matrix element j3, and signal value matrix K includes matrix element j4. A position of matrix element j1 in the signal value matrix of the first fingerprint image, a position of matrix element j2 in the signal value matrix of the first calibration image, a position of matrix element j3 in the signal value matrix of the second calibration image, and a position of matrix element j4 in signal value matrix K are same. Matrix element j1 is any matrix element in the signal value matrix of the first fingerprint image. Matrix element j2 is any matrix element in the signal value matrix of the first calibration image. Matrix element j3 is any matrix element in the signal value matrix of the second calibration image. Matrix element j4 is any matrix element in signal value matrix K, where the signal value matrix K is any matrix among the N signal value matrices.

Figure 2D:
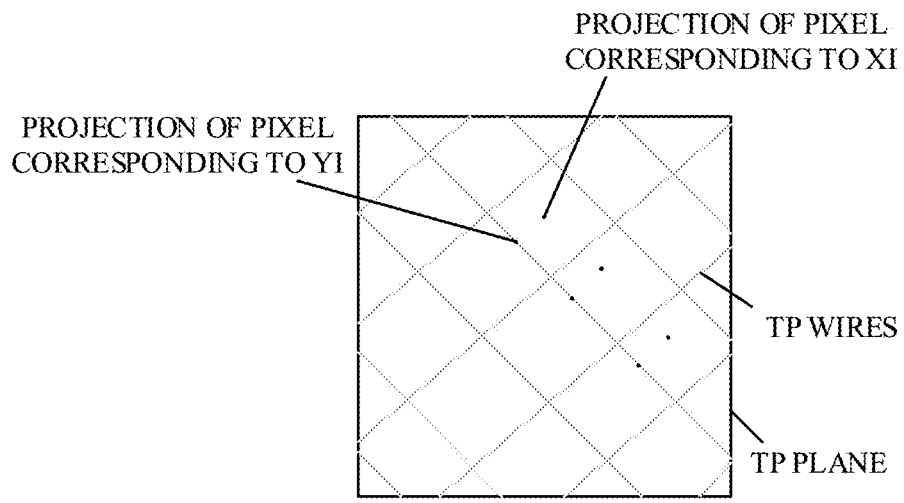
FIG. 2D is a schematic diagram illustrating projections of pixels on a touch panel (TP) according to implementations of the disclosure.

The variance formula is: $S=[(x_1-Avg)^2+\cdots+(x_m-Avg)^2+(y_1-Avg)^2+\cdots+(y_n-Avg)^2]/N$, where n+m=N, Avg represents an average signal value, and $x_i$ and $y_i$, both represent signal values. As illustrated in FIG. 2D, a projection of a pixel corresponding to the signal value $x_i$ on the TP does not fall on TP wires, and a projection of a pixel corresponding to the signal value $y_i$, on the TP falls on the TP wires. As can be seen, n represents the number of pixels whose projections on the TP fall on the TP wires, and m represents the number of pixels whose projections on the TP do not fall on the TP wires.

According to the above formula, when an average signal value Avg and signal values $x_i$ and $y_i$, that are associated with each of the N signal value matrices are respectively substituted into the variance formula, N variances are obtained, where each variance corresponds to a signal value matrix ($f_{AC}$). For example, a signal value matrix includes 5 matrix elements (such as matrix element Q, matrix element W, matrix element E, matrix element R, and matrix element T), and projections of pixels that correspond to matrix element Q, matrix element E, and matrix element T on the TP do not fall on the TP wires and projections of pixels that correspond to matrix element W and matrix element R on the TP fall on the TP wires, the average signal value Avg associated with the signal value matrix can be expressed by: Avg=(Q+W+E+R+T)/5, and then the variance corresponding to the signal value matrix is: $S=[(Q-Avg)^2+(E-Avg)^2+(T-Avg)^2+(W-Avg)^2+(R-Avg)^2]/5$.

For an image, the variance corresponding to the image is indicative of the uniformity of the image. A relatively accurate background processing may cause a smaller variance. Therefore, when the variance corresponding to the image is minimum, the second numerical value corresponding to the variance is also closest to the actual situation.

At block 203, the electronic device calibrates the first fingerprint image according to the first numerical value to obtain a second fingerprint image.

After the operation at block 203 is completed, the electronic device can conduct fingerprint verification with the second fingerprint image.

In at least one implementation, operations at block 203 are as follows.

The electronic device obtains the second fingerprint image by performing image calibration according to a signal value matrix of the first fingerprint image, the first numerical value, a signal value matrix of the second calibration image, and a second function.

The second function is: r1=Raw−k*RL, where r1 represents a signal value matrix of a fingerprint image calibrated, k is a numerical value associated with a change in the brightness of the light source for fingerprint collection, Raw represents a signal value matrix of a fingerprint image without calibration, and RL represents a signal value matrix of a calibration image corresponding to the dark surface of the calibration box.

The number of rows of the signal value matrix of the first fingerprint image, the number of rows of the signal value matrix of the second calibration image, and the number of rows of the signal value matrix of the second fingerprint image are the same. The number of columns of the signal value matrix of the first fingerprint image, the number of columns of the signal value matrix of the second calibration image, and the number of columns of the signal value matrix of the second fingerprint image are the same.

If the signal value matrix of the second fingerprint image includes matrix element p1, the signal value matrix of the first fingerprint image includes matrix element p2, and the signal value matrix of the second calibration image includes matrix element p3, a position of matrix element p1 in the signal value matrix of the second fingerprint image, a position of matrix element p2 in the signal value matrix of the first fingerprint image, and a position of matrix element p3 in the signal value matrix of the second calibration image are the same. Matrix element p1 is any matrix element in the signal value matrix of the second fingerprint image, matrix element p2 is any matrix element in the signal value matrix of the first fingerprint image, and matrix element p3 is any matrix element in the signal value matrix of the second calibration image.

As can be seen, in the implementations of the disclosure, a numerical value is determined according to the collected fingerprint image and the two calibration images, where the numerical value is indicative of the change in the brightness of the light source for the fingerprint collection. Thereafter, the collected fingerprint image is adaptively calibrated based on the determined numerical value, so that the fingerprint image can be adaptively calibrated with the change in actual brightness of the light source for the fingerprint collection, which can improve the quality of the fingerprint image used for subsequent fingerprint verification, thereby reducing a false rejection rate (FRR).

In at least one implementation, prior to operations at block 202, the following can be further conducted. The electronic device determines that an event to be unlocked corresponding to the fingerprint collection is a set unlocking event.

In one example, a matching degree of fingerprint verification required by the set unlocking event is greater than or equal to a second threshold. The set unlocking event may include, for example, a fingerprint payment event, a fingerprint activation event for applications (such as a payment application, an instant message application, etc.), a screen unlocking event, or the like.

As can be seen, in the implementation, since it may take a period of time to determine the first numerical value and not all the events to be unlocked require a high matching degree of fingerprint verification, the operations at block 202 to 203 are executed only when the event to be unlocked corresponding to the fingerprint collection is the set unlocking event, so that the power consumption of the electronic device can be reduced to some extent.

In at least one implementation, prior to the operations at block 202, the following can be further conducted. The electronic device determines that a current system time is within a set time period, where the set time period is a non-frequently used time period of the electronic device.

In one example, the set time period includes, for example, 0:00 am~7:00 am, 12:00 pm~-14:00 pm, or the like.

As can be seen, in the implementation, if the electronic device performs fingerprint collection in the non-frequently used time period of the electronic device, it may indicate that an input for triggering the fingerprint collection may not be from a user of the electronic device, and thus in order to avoid information leakage, a fingerprint image collected via the fingerprint collection may be calibrated.

In at least one implementation, prior to the operations at block 202, the following can be further conducted. The electronic device determines whether a time interval between a time at which a third fingerprint image is collected and a current system time is greater than or equal to a first threshold, where the third fingerprint image is collected before the first fingerprint image. The operations at block 202 are as follows. The electronic device determines the first numerical value according to the first fingerprint image, the first calibration image, and the second calibration image, in response to determining that the time interval between the time at which the third fingerprint image is collected and the current system time is greater than or equal to the first threshold.

The first threshold may be 30 second (s), 1 minute (min), 2 min, 5 min, 10 min, or the like.

The third fingerprint image is a fingerprint image without subject to background noise elimination, that is, the third fingerprint image is not calibrated according to a fourth numerical value.

In at least one implementation, the method further includes the following. The electronic device calibrates the first fingerprint image according to the fourth numerical value to obtain a fourth fingerprint image, in response to the time interval between the time at which the third fingerprint image is collected and the current system time being less than the first threshold, where the fourth numerical value is used for calibrating the third fingerprint image.

It can be noted that a manner in which the first fingerprint image is calibrated according to the fourth numerical value to obtain the fourth fingerprint image is the same as that in which the first fingerprint image is calibrated according to the first numerical value to obtain the second fingerprint image, which are not repeated herein.

As can be seen, in the implementation, since it may take a period of time to determine the first numerical value, the operations at block 202 to 203 are executed only when the time interval between the fingerprint image currently collected and the fingerprint image collected last time is relatively large, so that the power consumption of the electronic device can be reduced to some extent. In addition, if the time interval between the fingerprint image currently collected and the fingerprint image collected last time is relatively small, the fingerprint image collected currently can be calibrated according to the numerical value used for calibration of the fingerprint image collected last time, and numerical value calculation may not be performed once more, thereby further reducing the power consumption of the electronic device to some extent.

In at least one implementation, after the operation at block 203 is performed, the following can be further conducted. When fingerprint verification with the second fingerprint image fails or the fingerprint verification with the fourth fingerprint image fails, the electronic device obtains a fifth fingerprint image (also referred to as a target fingerprint image) by performing image calibration according to a signal value matrix of the first fingerprint image, a signal value matrix of the second calibration image, and a third function, where the third function is: r2=Raw−RL, r2 represents a signal value matrix of a fingerprint image calibrated, Raw represents a signal value matrix of a fingerprint image without calibration, and RL represents a signal value matrix of a calibration image corresponding to the dark surface of the calibration box. The electronic device performs fingerprint verification with the fifth fingerprint image. In this case, the brightness of the light source for the fingerprint collection can be deemed to be unchanged.

The number of rows of the signal value matrix of the first fingerprint image, the number of rows of the signal value matrix of the second calibration image, and the number of rows of the signal value matrix of the fifth fingerprint image are the same. The number of columns of the signal value matrix of the first fingerprint image, the number of columns of the signal value matrix of the second calibration image, and the number of columns of the signal value matrix of the fifth fingerprint image are the same.

Assuming that the signal value matrix of the fifth fingerprint image includes matrix element s1, the signal value matrix of the first fingerprint image includes matrix element s2, and the signal value matrix of the second calibration image includes matrix element s3, and a position of matrix element s1 in the signal value matrix of the fifth fingerprint image, a position of matrix element s2 in the signal value matrix of the first fingerprint image, and a position of matrix element s3 in the signal value matrix of the second calibration image are the same. Matrix element s1 is any matrix element in the signal value matrix of the fifth fingerprint image, matrix element s2 is any matrix element in the signal value matrix of the first fingerprint image, and matrix element s3 is any matrix element in the signal value matrix of the second calibration image.

As can be seen, in the implementation of the disclosure, if the fingerprint verification based on the calibrated fingerprint image fails, it means that the numerical value used for calibrating the collected fingerprint image may be inaccurate. In this case, an initial calibration method is used to calibrate the collected fingerprint image, and then the fingerprint verification is conducted based on the fingerprint image calibrated with the initial calibration method, which can reduce the probability of failure of the fingerprint verification to a certain extent.

Figure 3:
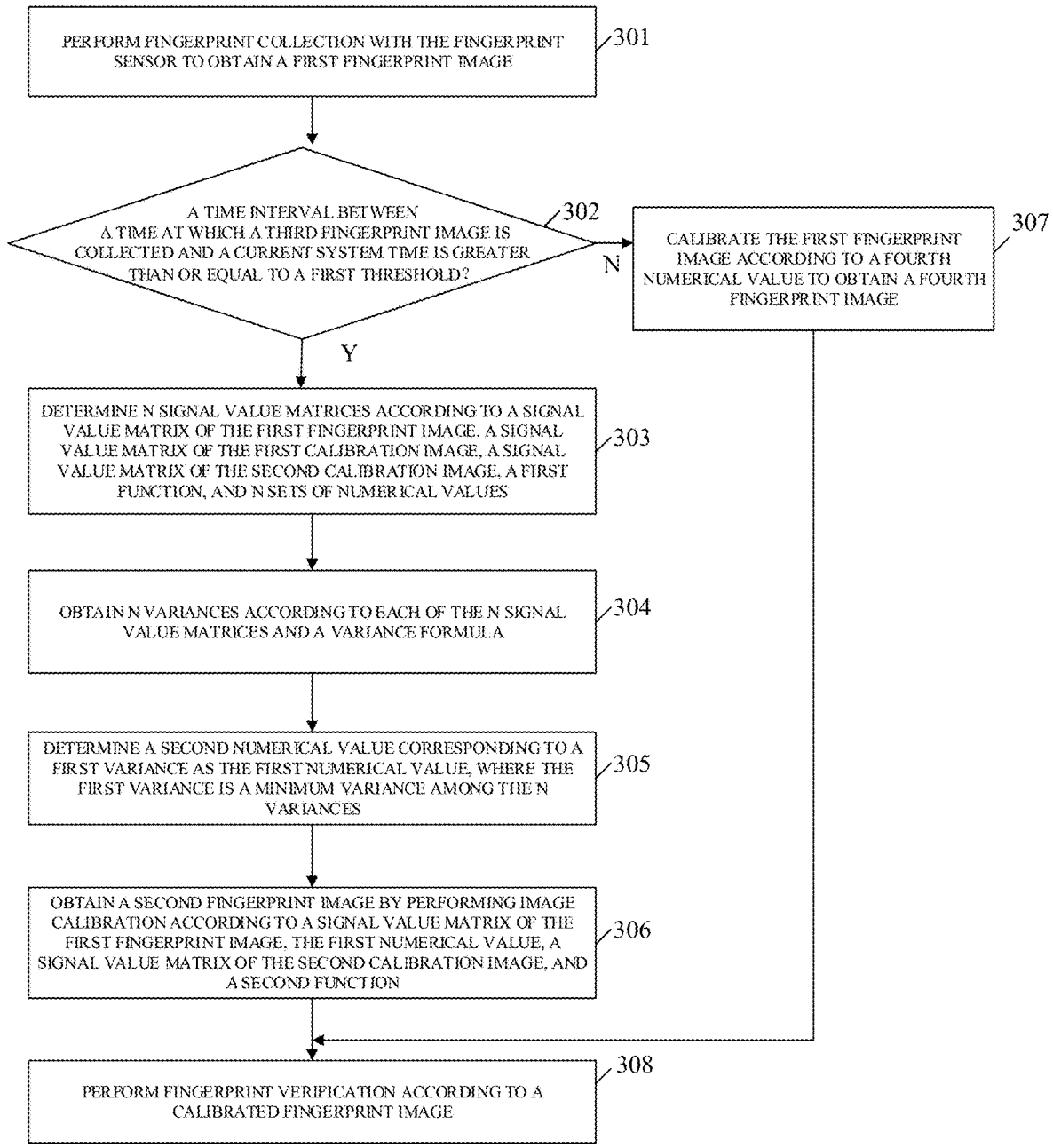
FIG. 3 is a schematic flow chart illustrating a calibration method according to other implementations of the disclosure.

Similar to the implementations illustrated in FIG. 2A, FIG. 3 is a schematic flow chart illustrating a calibration method according to other implementations of the disclosure. The calibration method is applicable to an electronic device. As illustrated in FIG. 3, the calibration method begins at block 301.

At block 301, the electronic device performs fingerprint collection with the fingerprint sensor to obtain a first fingerprint image.

At block 302, the electronic device determines whether a time interval between a time at which a third fingerprint image is collected and a current system time is greater than or equal to a first threshold, where the third fingerprint image is collected before the first fingerprint image.

If the time interval between the time at which the third fingerprint image is collected and the current system time is greater than or equal to the first threshold, the method proceeds to operations at block 303.

If the time interval between the time at which the third fingerprint image is collected and the current system time is less than the first threshold, the method proceeds to operations at block 307.

At block 303, the electronic device determines N signal value matrices according to a signal value matrix of the first fingerprint image, a signal value matrix of the first calibration image, a signal value matrix of the second calibration image, a first function, and N sets of numerical values, where each set of numerical values includes a second numerical value and a third numerical value, each second numerical value is indicative of a change in the brightness of the light source for fingerprint collection, and the N signal value matrices and the N sets of numerical values are in one-to-one correspondence.

At block 304, the electronic device obtains N variances according to each of the N signal value matrices and a variance formula.

At block 305, the electronic device determines a second numerical value corresponding to a first variance as the first numerical value, where the first variance is a minimum variance among the N variances.

At block 306, the electronic device obtains a second fingerprint image by performing image calibration according to a signal value matrix of the first fingerprint image, the first numerical value, a signal value matrix of the second calibration image, and a second function.

The second function is: r1=Raw−k*RL, where r1 represents a signal value matrix of a fingerprint image calibrated, k is a numerical value, Raw represents a signal value matrix of a fingerprint image without calibration, and RL represents a signal value matrix of a calibration image corresponding to the dark surface of the calibration box.

At block 307, the electronic device calibrates the first fingerprint image according to a fourth numerical value to obtain a fourth fingerprint image, where the fourth numerical value is used for calibration of the third fingerprint image.

At block 308, the electronic device performs fingerprint verification according to a calibrated fingerprint image (such as, the second fingerprint image or the fourth fingerprint image).

It can be understood that for specific implementation process of this implementation, reference may be made to the specific implementation process described in the above method implementation, which are not described herein.

Figure 4:
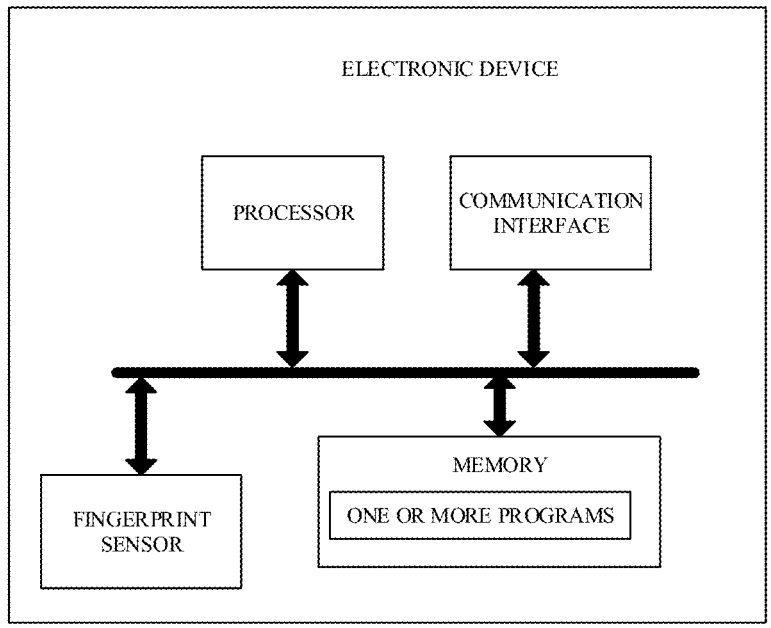
FIG. 4 is a schematic structural diagram illustrating an electronic device according to other implementations of the disclosure.

Similar to the above implementations in FIG. 2A and FIG. 3, FIG. 4 is a schematic structural diagram illustrating an electronic device according to implementations of the disclosure. As illustrated in FIG. 4, the electronic device includes a touch screen and a fingerprint sensor. The electronic device further includes a processor, a communication interface, and a memory storing one or more programs. The one or more programs are configured to be performed by the processor. The one or more programs include instructions for performing the following operations. Fingerprint collection is performed with the fingerprint sensor to obtain a first fingerprint image. A first numerical value is determined according to the first fingerprint image, a first calibration image, and a second calibration image, where the first numerical value is indicative of a change in brightness of a light source for the fingerprint collection, the first calibration image is an image obtained by performing image collection on a bright surface of a calibration box, and the second calibration image is an image obtained by performing image collection on a dark surface of the calibration box. The first fingerprint image is calibrated according to the first numerical value to obtain a second fingerprint image.

In at least one implementation, in terms of determining the first numerical value according to the first fingerprint image, the first calibration image, and the second calibration image, instructions of the one or more programs are configured to: determine N signal value matrices according to a signal value matrix of the first fingerprint image, a signal value matrix of the first calibration image, a signal value matrix of the second calibration image, a first function, and N sets of numerical values, where each set of numerical values includes a second numerical value and a third numerical value, each second numerical value is indicative of a change in the brightness of the light source for fingerprint collection, and the N signal value matrices and the N sets of numerical values are in one-to-one correspondence; obtain N variances according to each of the N signal value matrices and a variance formula; determine a second numerical value corresponding to a first variance as the first numerical value, where the first variance is a minimum variance among the N variances.

In at least one implementation, in terms of calibrating the first fingerprint image according to the first numerical value to obtain the second fingerprint image, instructions of the one or more programs are configured to: obtain the second fingerprint image by performing image calibration according to a signal value matrix of the first fingerprint image, the first numerical value, a signal value matrix of the second calibration image, and a second function.

The second function is: r1=Raw−k*RL, where r1 represents a signal value matrix of a fingerprint image calibrated, k is a numerical value, Raw represents a signal value matrix of a fingerprint image without calibration, and RL represents a signal value matrix of a calibration image corresponding to the dark surface of the calibration box.

In at least one implementation, prior to determining the first numerical value according to the first fingerprint image, the first calibration image, and the second calibration image, instructions of the one or more programs are further configured to: determine that an event to be unlocked corresponding to the fingerprint collection is a set unlocking event.

In at least one implementation, a matching degree of fingerprint verification required by the set unlocking event is greater than or equal to a second threshold.

In at least one implementation, prior to determining the first numerical value according to the first fingerprint image, the first calibration image, and the second calibration image, instructions of the one or more programs are further configured to: determine that a current system time is within a set time period, where the set time period is a non-frequently used time period of the electronic device.

In at least one implementation, prior to determining the first numerical value according to the first fingerprint image, the first calibration image, and the second calibration image, instructions of the one or more programs are further configured to: determine whether a time interval between a time at which a third fingerprint image is collected and a current system time is greater than or equal to a first threshold, where the third fingerprint image is collected before the first fingerprint image. In terms of determining the first numerical value according to the first fingerprint image, the first calibration image, and the second calibration image, instructions of the one or more programs are configured to: determine the first numerical value according to the first fingerprint image, the first calibration image, and the second calibration image, in response to determining that the time interval between the time at which the third fingerprint image is collected and the current system time is greater than or equal to the first threshold.

In at least one implementation, instructions of the one or more programs are further configured to: calibrate the first fingerprint image according to a fourth numerical value to obtain a fourth fingerprint image, in response to the time interval between the time at which the third fingerprint image is collected and the current system time being less than the first threshold, where the fourth numerical value is used for calibration of the third fingerprint image.

In at least one implementation, after calibrating the first fingerprint image according to the first numerical value to obtain the second fingerprint image, instructions of the one or more programs are further configured to: obtain, in response to failure of fingerprint verification with the second fingerprint image, a fifth fingerprint image by performing image calibration according to a signal value matrix of the first fingerprint image, a signal value matrix of the second calibration image, and a third function, where the third function is: r2=Raw−RL, r2 represents a signal value matrix of a fingerprint image calibrated, Raw represents a signal value matrix of a fingerprint image without calibration, and RL represents a signal value matrix of a calibration image corresponding to the dark surface of the calibration box; perform fingerprint verification with the fifth fingerprint image.

It can be understood that for specific implementation process of this implementation, reference may be made to the specific implementation process described in the above method implementations, which are not described herein.

The foregoing implementations mainly introduce the solution of the implementation of the disclosure from the perspective of performing the process on the method side. It can be understood that the electronic device includes corresponding hardware structures and/or software modules for performing the respective functions in order to implement the above functions. Those skilled in the art will readily appreciate that the disclosure can be implemented in hardware or a combination of hardware and computer software in combination with the elements and algorithm steps of the various examples described in the implementations disclosed herein. Whether a function is implemented in hardware or computer software to drive hardware depends on the specific application and design constraints of the solution. A person skilled in the art can use different methods for each particular application to implement the described functionality, but such implementation should not be considered to be beyond the scope of the disclosure.

In the implementations of the disclosure, the electronic device may be divided into functional unit according to the method implementations. For example, the functional units may be divided according to various functions, or two or more functions may be integrated into one processing unit. The integrated unit can be implemented in the form of hardware or in the form of a software functional unit. It should be noted that the unit division in the implementation of the disclosure is illustrative and only a logical function division, and there can be other manners of division during actual implementations.

Figure 5:
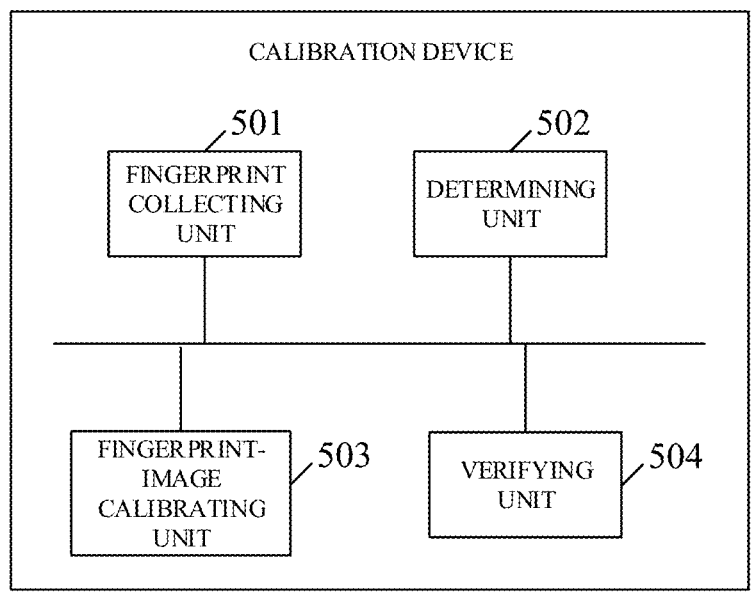
FIG. 5 is a schematic structural diagram illustrating a calibration device according to implementations of the disclosure.

The following are device implementations of the disclosure, and the device implementations are configured to execute the methods implemented in the method implementations. FIG. 5 is a schematic structural diagram illustrating a calibration device according to implementations of the disclosure. The calibration device is applicable to an electronic device including a touch screen and a fingerprint sensor. The calibration device includes a fingerprint collecting unit 501, a determining unit 502, and a fingerprint-image calibrating unit 503. The fingerprint collecting unit 501 is configured to perform fingerprint collection with the fingerprint sensor to obtain a first fingerprint image. The determining unit 502 is configured to determine a first numerical value according to the first fingerprint image, a first calibration image, and a second calibration image, where the first numerical value is indicative of a change in brightness of a light source for the fingerprint collection, the first calibration image is an image obtained by performing image collection on a bright surface of a calibration box, and the second calibration image is an image obtained by performing image collection on a dark surface of the calibration box. The fingerprint-image calibrating unit 503 is configured to calibrate the first fingerprint image according to the first numerical value to obtain a second fingerprint image.

In at least one implementation, the determining unit 502 configured to determine the first numerical value according to the first fingerprint image, the first calibration image, and the second calibration image is configured to: determine N signal value matrices according to a signal value matrix of the first fingerprint image, a signal value matrix of the first calibration image, a signal value matrix of the second calibration image, a first function, and N sets of numerical values, where each set of numerical values includes a second numerical value and a third numerical value, each second numerical value is indicative of a change in the brightness of the light source for fingerprint collection, and the N signal value matrices and the N sets of numerical values are in one-to-one correspondence; obtain N variances according to each of the N signal value matrices and a variance formula; determine a second numerical value corresponding to a first variance as the first numerical value, where the first variance is a minimum variance among the N variances.

In at least one implementation, the fingerprint-image calibrating unit 503 configured to calibrate the first fingerprint image according to the first numerical value to obtain the second fingerprint image is configured to: obtain the second fingerprint image by performing image calibration according to a signal value matrix of the first fingerprint image, the first numerical value, a signal value matrix of the second calibration image, and a second function, where the second function is: r1=Raw−k*RL, r1 represents a signal value matrix of a calibrated fingerprint image, k is a numerical value, Raw represents a signal value matrix of a fingerprint image without calibration, and RL represents a signal value matrix of a calibration image corresponding to the dark surface of the calibration box.

In at least one implementation, the determining unit 502 is further configured to: determine that an event to be unlocked corresponding to the fingerprint collection is a set unlocking event, prior to determining the first numerical value according to the first fingerprint image, the first calibration image, and the second calibration image.

In at least one implementation, a matching degree of fingerprint verification required by the set unlocking event is greater than or equal to a second threshold.

In at least one implementation, the determining unit 502 is further configured to: determine that a current system time is within a set time period, where the set time period is a non-frequently used time period of the electronic device, prior to determining the first numerical value according to the first fingerprint image, the first calibration image, and the second calibration image.

In at least one implementation, the determining unit 502 is further configured to: determine whether a time interval between a time at which a third fingerprint image is collected and a current system time is greater than or equal to a first threshold, where the third fingerprint image is collected before the first fingerprint image, prior to determining the first numerical value according to the first fingerprint image, the first calibration image, and the second calibration image. The determining unit 502 configured to determine the first numerical value according to the first fingerprint image, the first calibration image, and the second calibration image is configured to: determine the first numerical value according to the first fingerprint image, the first calibration image, and the second calibration image, in response to determining that the time interval between the time at which the third fingerprint image is collected and the current system time is greater than or equal to the first threshold.

In at least one implementation, the fingerprint-image calibrating unit 503 is further configured to: calibrate the first fingerprint image according to a fourth numerical value to obtain a fourth fingerprint image, in response to the time interval between the time at which the third fingerprint image is collected and the current system time being less than the first threshold, where the fourth numerical value is used for calibration of the third fingerprint image.

In at least one implementation, the calibration device further includes a verifying unit 504.

The fingerprint-image calibrating unit 503 is further configured to: obtain, in response to failure of fingerprint verification with the second fingerprint image, a fifth fingerprint image by performing image calibration according to a signal value matrix of the first fingerprint image, a signal value matrix of the second calibration image, and a third function, where the third function is: r2=Raw−RL, r2 represents a signal value matrix of a fingerprint image calibrated, Raw represents a signal value matrix of a fingerprint image without calibration, and RL represents a signal value matrix of a calibration image corresponding to the dark surface of the calibration box. The verifying unit 504 is configured to perform fingerprint verification with the fifth fingerprint image.

It can be understood that the fingerprint collection unit 501, the determining unit 502, the fingerprint-image calibrating unit 503, and the verifying unit 504 can be implemented by a processor.

Implementations of the disclosure also provide a computer storage medium. The computer storage medium is configured to store computer programs for electronic data interchange. The computer programs, when executed, are operable with a computer to perform all or part of the operations of any of the methods described in the above-described method implementation. The computer includes an electronic device.

Implementations of the disclosure also provide a computer program product. The computer program product includes a non-transitory computer-readable storage medium storing computer programs. The computer programs are operable with a computer to perform all or part of the operations of any of the methods described in the above method implementations. The computer program product may be a software installation package. The computer may be an electronic device.

It is to be noted that, for the sake of simplicity, the foregoing method implementations are described as a series of action combinations, however, it will be appreciated by those skilled in the art that the disclosure is not limited by the sequence of actions described. According to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device/apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or not performed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the disclosure. The memory includes various medium capable of storing program codes, such as a universal serial bus (USB) flash disk, a read-only memory (ROM), a RAM, a removable hard disk, a disk, a CD, or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the disclosure in detail. The principle and implementations of the disclosure are illustrated by specific examples. The illustration of the above implementations is merely used to facilitate understanding of the methods and core concept of the disclosure. For a person skilled in the art, according to the concept of the disclosure, specific implementations and application ranges may be both changed. Based on the above, the disclosure shall not be understood to be limited to the specification.

What is claimed is:

1. A calibration method, being applicable to an electronic device comprising a fingerprint sensor, the calibration method comprising:
    performing fingerprint collection with the fingerprint sensor to obtain a first fingerprint image;
    determining a first numerical value according to the first fingerprint image, a first calibration image, and a second calibration image, wherein the first numerical value is indicative of a change in brightness of a light source for the fingerprint collection, the first calibration image is an image obtained by performing image collection on a bright surface of a calibration box, and the second calibration image is an image obtained by performing image collection on a dark surface of the calibration box, wherein the calibration box is used for performing calibration and comprises two fixed reflective surfaces comprising the bright surface and the dark surface; and
    calibrating the first fingerprint image according to the first numerical value to obtain a second fingerprint image.

2. The calibration method of claim 1, further comprising:
    prior to determining the first numerical value according to the first fingerprint image, the first calibration image, and the second calibration image,
        determining that an event to be unlocked corresponding to the fingerprint collection is a set unlocking event.

3. The calibration method of claim 2, wherein a matching degree of fingerprint verification required by the set unlocking event is greater than or equal to a threshold.

4. The calibration method of claim 1, further comprising:
    prior to determining the first numerical value according to the first fingerprint image, the first calibration image, and the second calibration image,
        determining that a current system time is within a set time period.

5. The calibration method of claim 1, further comprising:
    prior to determining the first numerical value according to the first fingerprint image, the first calibration image, and the second calibration image,
        determining whether a time interval between a time at which a third fingerprint image is collected and a current system time is greater than or equal to a threshold, wherein the third fingerprint image is collected before the first fingerprint image; wherein
        determining the first numerical value according to the first fingerprint image, the first calibration image, and the second calibration image comprises:
        determining the first numerical value according to the first fingerprint image, the first calibration image, and the second calibration image, in response to determining that the time interval between the time at which the third fingerprint image is collected and the current system time is greater than or equal to the threshold.

6. The calibration method of claim 5, further comprising:
    calibrating the first fingerprint image according to a numerical value for calibration of the third fingerprint image to obtain a fourth fingerprint image, in response to the time interval between the time at which the third fingerprint image is collected and the current system time being less than the threshold.

7. The calibration method of claim 1, further comprising:
    after calibrating the first fingerprint image according to the first numerical value to obtain the second fingerprint image,
        obtaining, in response to failure of fingerprint verification with the second fingerprint image, a target fingerprint image by performing image calibration according to a signal value matrix of the first fingerprint image, a signal value matrix of the second calibration image, and a third function, wherein the third function is: r2=Raw−RL, wherein r2 represents a signal value matrix of a fingerprint image calibrated, Raw represents a signal value matrix of a fingerprint image without calibration, and RL represents a signal value matrix of a calibration image corresponding to the dark surface of the calibration box; and
    performing fingerprint verification with the target fingerprint image.

8. An electronic device, comprising:
    a fingerprint sensor;
    a processor; and
    a memory coupled to the processor and storing one or more programs;
    the one or more programs which, when executed by the processor, cause the processor to:
        perform fingerprint collection with the fingerprint sensor to obtain a first fingerprint image;
        determine a first numerical value according to the first fingerprint image, a first calibration image, and a second calibration image, wherein the first numerical value is indicative of a change in brightness of a light source for the fingerprint collection, the first calibration image is an image obtained by performing image collection on a bright surface of a calibration box, and the second calibration image is an image obtained by performing image collection on a dark surface of the calibration box, wherein the calibration box is used for performing calibration and comprises two fixed reflective surfaces comprising the bright surface and the dark surface; and calibrate the first fingerprint image according to the first numerical value to obtain a second fingerprint image.

9. The electronic device of claim 8, wherein the one or more programs, when executed by the processor, further cause the processor to:
determine that an event to be unlocked corresponding to the fingerprint collection is a set unlocking event, prior to determining the first numerical value according to the first fingerprint image, the first calibration image, and the second calibration image.

10. The electronic device of claim 8, wherein the one or more programs, when executed by the processor, further cause the processor to:
determine that a current system time is within a set time period, prior to determining the first numerical value according to the first fingerprint image, the first calibration image, and the second calibration image.

11. The electronic device of claim 8, wherein the one or more programs, when executed by the processor, further cause the processor to:
prior to determining the first numerical value according to the first fingerprint image, the first calibration image, and the second calibration image,
determine whether a time interval between a time at which a third fingerprint image is collected and a current system time is greater than or equal to a threshold, wherein the third fingerprint image is collected before the first fingerprint image, wherein
the one or more programs executed by the processor to determine the first numerical value according to the first fingerprint image, the first calibration image, and the second calibration image are executed by the processor to:
determine the first numerical value according to the first fingerprint image, the first calibration image, and the second calibration image, in response to determining that the time interval between the time at which the third fingerprint image is collected and the current system time is greater than or equal to the threshold.

12. The electronic device of claim 11, wherein the one or more programs, when executed by the processor, further cause the processor to:
calibrate the first fingerprint image according to a numerical value for calibration of the third fingerprint image to obtain a fourth fingerprint image, in response to the time interval between the time at which the third fingerprint image is collected and the current system time being less than the threshold.

13. The electronic device of claim 8, wherein the one or more programs, when executed by the processor, further cause the processor to:
obtain, in response to failure of fingerprint verification with the second fingerprint image, a target fingerprint image by performing image calibration according to a signal value matrix of the first fingerprint image, a signal value matrix of the second calibration image, and a third function, wherein the third function is: r2=Raw−RL, wherein r2 represents a signal value matrix of a fingerprint image calibrated, Raw represents a signal value matrix of a fingerprint image without calibration, and RL represents a signal value matrix of a calibration image corresponding to the dark surface of the calibration box; and
perform fingerprint verification with the target fingerprint image.

14. A non-transitory computer-readable storage medium storing computer programs, wherein the computer programs, when executed by a processor, cause the processor to:
perform fingerprint collection with a fingerprint sensor to obtain a first fingerprint image;
determine a first numerical value according to the first fingerprint image, a first calibration image, and a second calibration image, wherein the first numerical value is indicative of a change in brightness of a light source for the fingerprint collection, the first calibration image is an image obtained by performing image collection on a bright surface of a calibration box, and the second calibration image is an image obtained by performing image collection on a dark surface of the calibration box, wherein the calibration box is used for performing calibration and comprises two fixed reflective surfaces comprising the bright surface and the dark surface; and
calibrate the first fingerprint image according to the first numerical value to obtain a second fingerprint image.

* * * * *